United States Patent
Wilder et al.

(10) Patent No.: US 6,746,501 B1
(45) Date of Patent: Jun. 8, 2004

(54) VACUUM BAG COLLAR WITH ROTATABLE CLOSURE

(75) Inventors: Brent A. Wilder, Bloomington, IL (US); Dennis Boehmer, Waterloo (CA)

(73) Assignee: Wildwood Industries, Inc., Bloomington, IL (US)

( * ) Notice: Subject to any disclaimer, the term of this patent is extended or adjusted under 35 U.S.C. 154(b) by 0 days.

(21) Appl. No.: 10/090,042

(22) Filed: Feb. 27, 2002

Related U.S. Application Data

(60) Provisional application No. 60/272,263, filed on Feb. 28, 2001.

(51) Int. Cl.[7] .................. B01D 46/02; B29C 53/04
(52) U.S. Cl. .............. 55/367; 55/369; 55/DIG. 2; 55/DIG. 3; 15/347; 156/227; 264/249; 264/339
(58) Field of Search .............. 55/367, 369, 374, 55/381, 370, 371, 373, 378, DIG. 2, DIG. 3; 15/347; 156/227; 264/249, 339

(56) References Cited

U.S. PATENT DOCUMENTS

| | | | |
|---|---|---|---|
| 1,007,390 A | | 10/1911 | Robinson |
| 2,758,667 A | | 8/1956 | Brace |
| 3,297,232 A | * | 1/1967 | Fesco .............. 55/DIG. 2 |
| 3,616,621 A | * | 11/1971 | Fesco .............. 55/DIG. 2 |
| 4,861,357 A | | 8/1989 | Gavin et al. |
| 4,877,432 A | | 10/1989 | Lackner |
| 5,064,455 A | | 11/1991 | Lackner |
| 5,092,915 A | | 3/1992 | Lackner |
| 5,158,635 A | | 10/1992 | Schmierer et al. |
| 5,468,271 A | | 11/1995 | Sauer et al. |
| 5,468,272 A | | 11/1995 | Schmierer |
| 5,472,460 A | | 12/1995 | Schmierer |
| 5,472,465 A | | 12/1995 | Schmierer |
| 5,725,619 A | | 3/1998 | Brule et al. |
| 5,725,620 A | | 3/1998 | Perea et al. |
| 5,772,712 A | * | 6/1998 | Perea et al. .............. 55/367 |
| 5,820,643 A | | 10/1998 | Lienenluke |

FOREIGN PATENT DOCUMENTS

| | | |
|---|---|---|
| DE | 2407478 | 8/1974 |
| DE | 3919256 | 12/1990 |
| DE | 4227617 | 2/1994 |
| GB | 27162 | 12/1908 |

* cited by examiner

*Primary Examiner*—Minh-Chau T. Pham
(74) *Attorney, Agent, or Firm*—Piper Rudnick LLP

(57) ABSTRACT

A collar for a vacuum cleaner bag having a user operated closure, the collar being formed from a blank of relatively rigid material and folded to define first and second full outer panels and a partial inner panel, the partial inner panel being adhesively secured to the first and second full outer panels and having an occlusion element attached by weak retention bands of collar blank material and the occlusion element further contains a detachable pivot and a partial aperture cut-out, and the first and second full panels contain apertures which are aligned with the partial aperture of the occlusion element, such that the occlusion element pivots on the detachable pivot from an open position to a closed position, occluding the apertures on the first and second outer panels.

8 Claims, 2 Drawing Sheets

VACUUM BAG COLLAR WITH ROTATABLE CLOSURE

CLAIM OF PRIORITY

This application claims priority from U.S. Provisional Patent Application Ser. No. 60/272,263 filed Feb. 28, 2001 now abandoned.

BACKGROUND OF THE INVENTION

1. Field of Invention

This invention finds use in the field of collection bags, such as those used in vacuum cleaners and other debris collection devices and more particularly, to a rigid collar that is attached to a vacuum cleaner collection bag that can be sealed by the user by way of a rotatable closure element upon removal of the bag and collar from the output nozzle of the vacuum cleaner.

2. Description of Prior Art

Disposable vacuum bags for use in a vacuum cleaner are characteristically provided with collars for attachment to the vacuum outlet nozzle. Recently, some collar designs have included closures such that, when the vacuum bag is removed from the vacuum cleaner after use, the bag may be closed or sealed at the collar to retain therein the dirt and other particulate matter trapped in the bag. While great creativity, time and effort have been directed to the provision of a dependable automatically closable collar—that is, a collar which is reliably self-sealing immediately upon removal from the output nozzle of a vacuum cleaner—many disposable vacuum bag users still prefer the certainty of a manually closable collar—that is, a collar which the user himself or herself seals after removal of the vacuum bag from the vacuum outlet nozzle.

Over time, a variety of manually closable collars have been designed and placed available on the market. Many designs require the presence of a portion enabling movement of a closure member from one location to another. It has been found that the provision of an easily flexible collar portion results in a complex and hence costly collar. This is particularly true with collars comprised of two or more separate pieces that are bonded to form a complete collar. While most basic vacuum bags may have only a one-ply die cut or a two-ply sandwiched collar, some of the manually closable constructions require additional ply layers, thus increasing the material cost and manufacturing expense of producing such bags. Finally, in the known three-ply collars of manually closable bags not requiring a flexible collar portion, higher production costs are involved. Once the collar has been appropriately folded, the fold between the closure member and another ply of the collar must be cut in order to free the closure member for movement relative to the remainder of the collar. This extra processing step entails additional manufacturing expense as well as the waste of a certain amount of the raw material since a fold between the closure member and another ply must be cut away and discarded.

One-piece, three-ply designs are well known in the art, such as U.S. Pat. Nos. 5,725,620 and 5,772,712 to Perea et al. However, such collars, while improvements over the previous art, still require numerous production punches and cuts to produce the finished piece.

It is therefore an object of the present invention to provide a manually closable collar for a vacuum cleaner bag, which collar is economical to and easy to manufacture, in that a minimal number of post assembly steps are required.

It is another object of the present invention to provide a collar that is simple for the end user to operate.

It is an additional object of the present invention to provide a collar that adequately seals the filled vacuum cleaner bag such that a minimal amount of collected material is spilt or otherwise lost.

SUMMARY OF INVENTION

To attain the objects described above according to this invention, there is provided a collar for a vacuum cleaner bag having a user operated closure. The collar is formed from a blank of relatively rigid material and is folded to define first and second full outer panels and a partial inner panel. The partial inner panel is partially adhesively secured to the first and second full outer panels, except at an occlusion element attached by weak retention bands of collar blank material. The occlusion element further contains a detachable pivot and a partial aperture cutout. The first and second full panels contain apertures that are aligned with the partial aperture of the occlusion element. The occlusion element pivots on the detachable pivot from an open position to a closed position, occluding the apertures on the first and second outer panels.

Other objects and advantages of the invention will become apparent from the following description of the invention wherein reference is specifically made to the drawings.

BRIEF DESCRIPTION OF THE DRAWINGS

Specific embodiments of the invention have been chosen for purposes of illustration and description, and are shown in the accompanying drawing, forming a part of the specification wherein.

DESCRIPTION OF PREFERRED EMBODIMENTS

Figure 1:
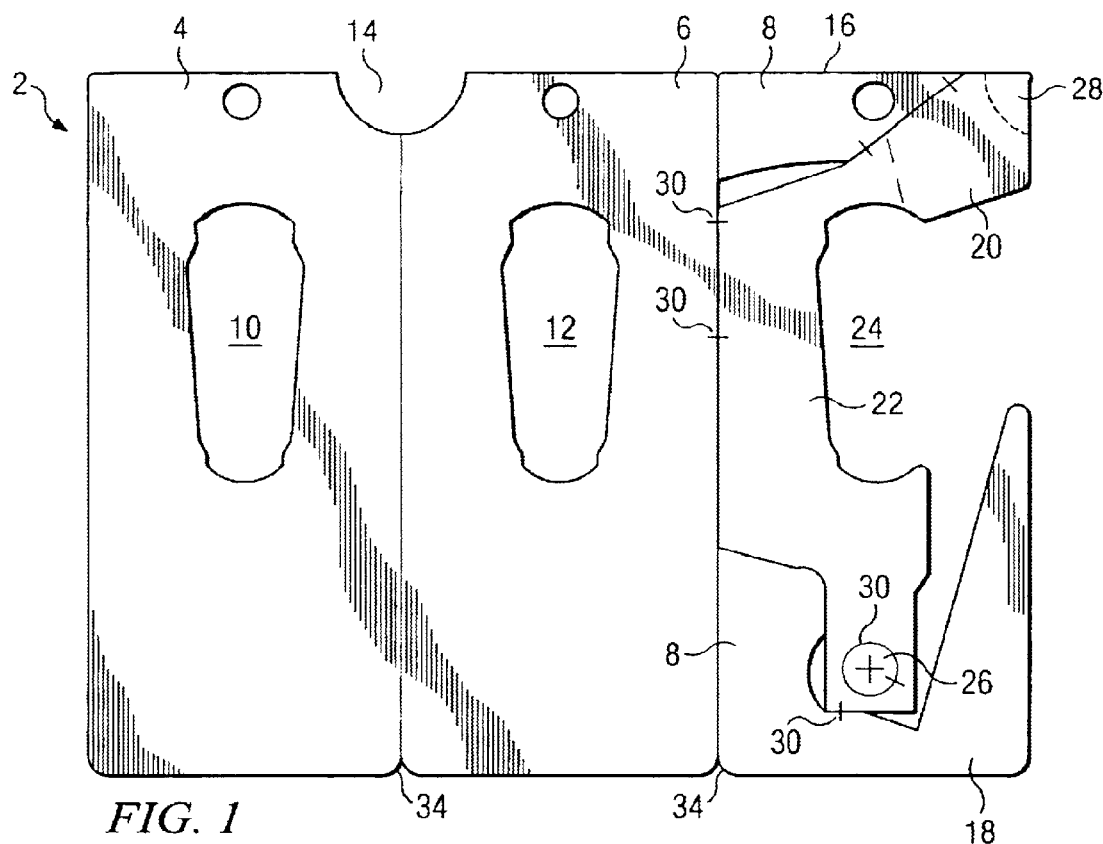
FIG. 1 is a front plan view of the vacuum bag collar of the present invention, prior to folding and assembly.

As shown in FIG. 1, the collar 2 of the instant invention is a one-piece design which is formed preferably through machine punching, although other methods of formation known in the art, such as cutting, may be utilized. A relatively rigid material is used to form the collar preferably paperboard, although other materials used in the art are acceptable. The collar 2 thus formed is adapted to be secured to a vacuum bag (not shown) by means know to one skilled in the art, such as glue, in order to form a manually closable vacuum cleaner bag.

The collar 2 can generally be divided into front piece or panel 4, back piece or panel 6, and middle piece or panel 8. Creases or fold-lines 34 are formed between the front 4 and back 6 panels and the back 6 and middle 8 panels. Front piece 4 and back piece 6 further contain apertures 10 and 12, respectively. The shape of apertures 10 and 12 is a matter of choice, generally dictated by the shape of the outlet nozzle of the vacuum cleaner model of interest, but should be of the same shape and size. Between panels 4 and 6 a cutout 14 is formed, preferably either during the initial production of the collar blank or during assembly.

Middle piece 8 is formed of three sections, top 16, bottom 18, and a pivoting occlusion element 20. Occlusion element 20 in turn is comprised of a body section 22 and further includes an opening or partial aperture 24, a detachable pivot element 26 and a corner 28. The shape and size of opening 24 should correspond to that of apertures 10 and 12. The middle piece is cut during punching such that the occlusion element 20 is fully detached from the top 16 and bottom 18 of middle piece 8, except at retaining portions or bridges 30. The detachable pivot element 26 is similarly retained upon the occlusion element by small bridges 30.

Figure 2:
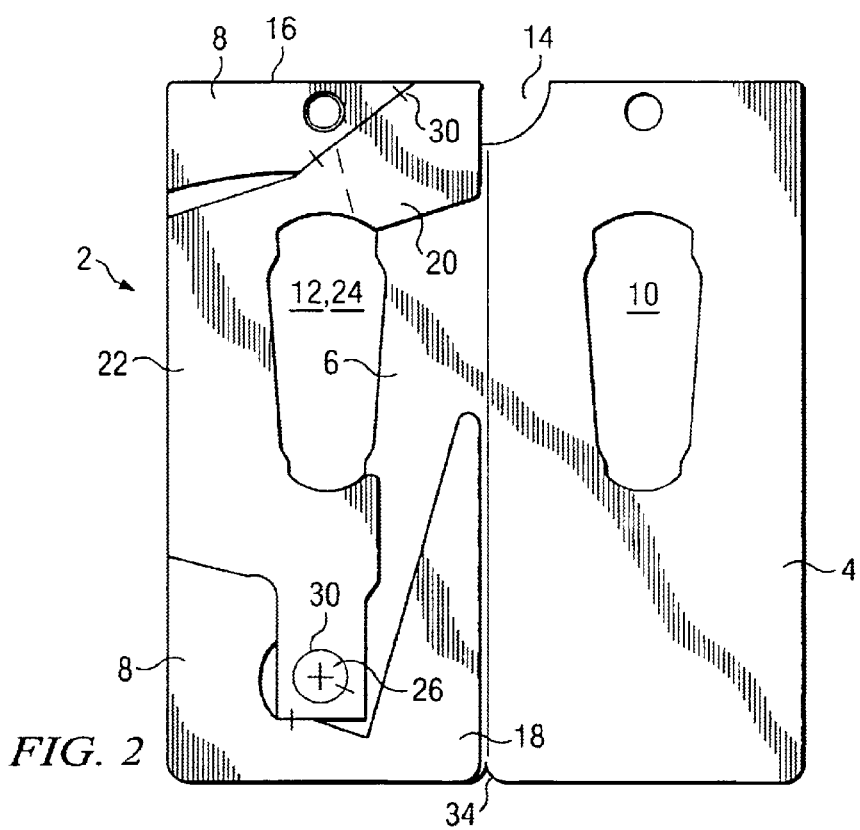
FIG. 2 is a rear plan view of the vacuum bag collar of the present invention, with the middle and back pieces being folded together.

Referring now to FIG. 2, the middle piece 8 and back piece 6 are shown folded together upon crease 34 such that aperture 12 and opening 24 are in alignment. The front and middle pieces are then secured together through an adhesive applied to the top 16 and bottom 18 of back-side of the middle piece 8 but not at occlusion element 20, except at the center of pivot 26. As can be appreciated, the folding and attachment steps can be automated.

Figure 3A:
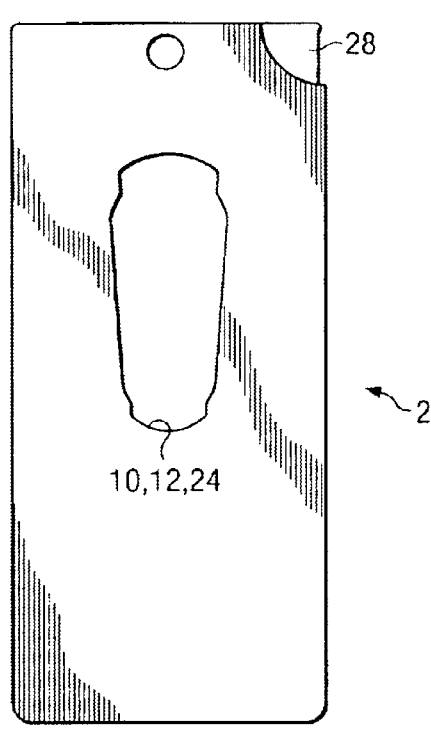
FIG. 3A is a front plan view of the vacuum bag collar of the present invention after final assembly.
Figure 3B:
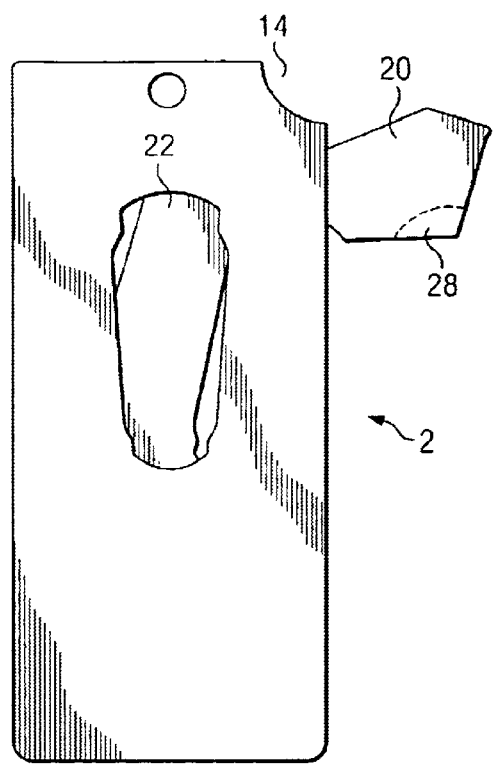
FIG. 3B is a front plan view of the vacuum bag collar of the present invention after final assembly illustrating operation of the occlusion element.

The completed collar is shown in FIGS. 3A and 3B. The front piece is folded over the middle piece and is secured through an adhesive applied to the top 16 and bottom 18 of the front side the middle piece 8. Adhesive is not applied lo occlusion element 20 except at the center of pivot 26. Therefore the middle piece 8 is sandwiched between back piece 6 and front piece 4 and is secured to these pieces at its top 16 and bottom 18 portions. A complete opening or aperture is formed in the collar by way of apertures 10 and 12 on the outside of the collar and opening 24 within the collar.

Figure 4:
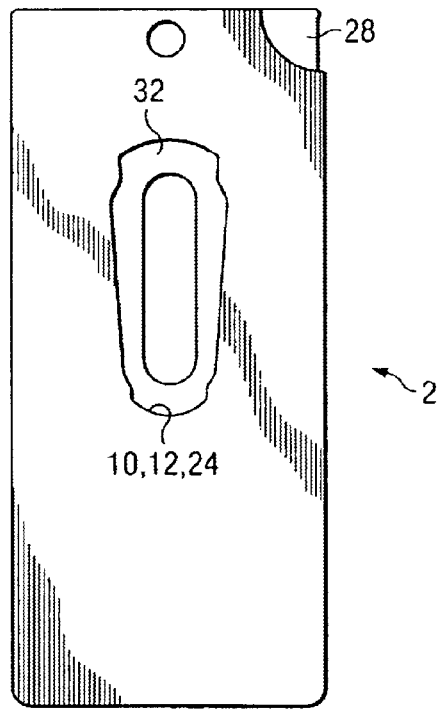
FIG. 4 is a front plan view of an alternative embodiment of the present invention after final assembly.

When the user wishes to occlude the opening created by apertures 10 and 12 and opening 24, he or she pulls downward on corner 28. This causes the retaining portions 30 to break, separating the occlusion element 20 from the middle section 8 as well as detaching the detachable pivot 26 from the occlusion element 20. The occlusion element 20 pivots about the pivot 26 such that the aforementioned apertures 10 and 12 and opening 24 are mostly or completely, blocked by the body 22 of the occlusion element. The occlusion element 20 is "overlapped" by, and thus retained, between the front 4 and back 6 pieces and cannot be removed due to interference between the attached front 4 and back 6 pieces as well as by the detachable pivot point 26. Shown in FIG. 4, a resilient membrane or gasket 32 of rubber or similar substance can be added to either the front or back piece during the assembly process such that the apertures 10 and 12 opening 24 are assured completely occluded in the final assembled product, once the occlusion element 20 is detached. The resilient membrane 32 also provides better fractional contact and attachment between the collar 2 and the vacuum outlet nozzle.

In addition to the structures, sequences, and uses immediately described above, it will be apparent to those skilled in the art that other modifications and variations can be made the method of the instant invention without diverging from the scope, spirit, or teaching of the invention. Therefore, it is the intention of the inventors that the description of instant invention should be considered illustrative and the invention is to be limited only as specified in the claims and equivalents thereto.

What is claimed is:

1. A user closable collar for a vacuum cleaner bag, comprising:
    a collar body formed from a single blank of relatively rigid material which is folded to define three generally overlapping and planar panels, said collar body further comprising:
        a partial inner panel which is adhesively secured to a first full outer panel and a second full outer panel;
        an occlusion element attached to said inner panel by weak retention bands of collar blank material, said occlusion element further containing a detachable pivot therein; and
        an aperture portion on said first outer panel and an apertured portion on said second outer panel, wherein said partial aperture of the occlusion element is aligned with the apertures of the middle panel and the second outer panel,
    whereby the occlusion element pivots on said detachable pivot from an open position to a closed position, occluding the apertures on the first and second outer panels.

2. The collar of claim 1 further comprising means for severing said weak retention bands and separating said occlusion element from said middle panel and said pivot from said occlusion element.

3. The collar of claim 1 further comprising a partial aperture cutout on said occlusion element.

4. The collar of claim 1 further comprising a resilient membrane intermediate to said middle panel and one of said first or second outer panels and defining an aperture therethrough aligned with said apertures of said outer panels.

5. The collar of claim 1 wherein the detachable pivot point is attached to said occlusion element by weak retention bands and is adhesively secured to said first and second outer panels.

6. A user closable collar for a vacuum cleaner bag, comprising:
    a collar body formed from a single blank of relatively rigid material which is folded to define three generally overlapping and planar panels, said collar body further comprising:
        a partial inner panel which is adhesively secured to a first full outer panel and a second full outer panel;
        an occlusion element attached to said inner panel by weak retention bands of collar blank material, said occlusion element further containing a detachable pivot therein and a partial aperture cut-out;
        an aperture portion on said first outer panel and an apertured portion on said second outer panel, wherein said partial aperture of the occlusion element is aligned with the apertures of the middle panel and the second outer panel; and
        a resilient membrane intermediate to said middle panel and one of said first or second outer panels and defining an aperture therethrough aligned with said apertures of said outer panels and with the partial aperture cutout of said occlusion element,
    whereby the occlusion element pivots on said detachable pivot from an open position to a closed position, occluding the apertures on the first and second outer panels.

7. A method of making a user closable collar for a vacuum cleaner bag, comprising the steps of:
    (a) folding a single blank of relatively rigid material to define three overlapping and generally planar panels, said panels defined by a first outer panel, a second outer panel each having apertured therein, and a partial inner panel having a top and bottom portions and occlusion element attached thereto by weak retention bands of collar material and further containing a detachable pivot point therein and a partial aperture cutout; and (b) adhesively securing the top and bottom portions of said middle panel and the detachable pivot point to said first and second outer panels, whereby in a closed position the partial aperture of the occlusion element and the apertures of the outer panels are in alignment and said apertures of the first and second outer panels are occluded when the user breaks the weak retention bands and pivots the occlusion element upon said pivot point to an open position.

8. The method of claim 7 further comprising the additional step of interposing a resilient membrane intermediate between one of said outer panels and said middle panel, the resilient membrane defining aperture aligned with the apertures of said outer panels.

* * * * *